UNITED STATES PATENT OFFICE.

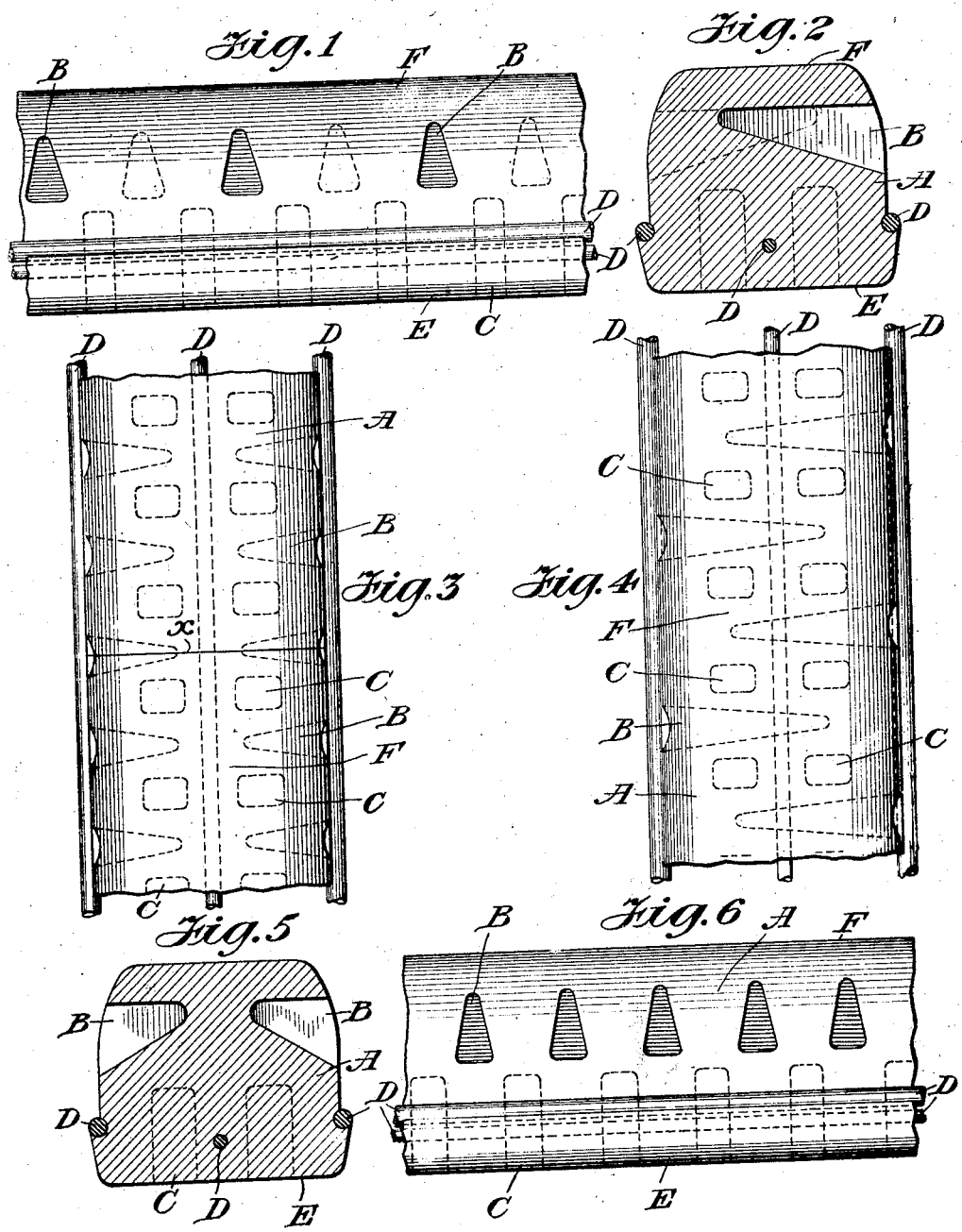

EDWIN B. CADWELL, OF DETROIT, MICHIGAN, ASSIGNOR OF ONE-THIRD TO FRANK JOHNSTON AND ONE-THIRD TO FRANK M. ASHLEY.

VEHICLE-TIRE.

No. 887,997.  Specification of Letters Patent.  Patented May 19, 1908.

Application filed May 5, 1905. Serial No. 258,953.

*To all whom it may concern:*

Be it known that I, EDWIN B. CADWELL, a citizen of the United States, residing at No. 789 Cass avenue, Detroit, Michigan, have invented certain new and useful Improvements in Vehicle-Tires, of which the following is a specification.

My invention pertains to tires for vehicles and particularly to that class known as cushion tires of this character, which will be strong, durable and resilient, and will present an unbroken tread surface.

Referring to the drawings which form part of this specification,—

Figure 1, is a longitudinal view of a section of my tire, showing recesses formed in its sides, and cells formed in its base, indicated by dotted lines. Fig. 2, is a cross section of the same construction as shown in Fig. 1. Fig. 3, is a plan view of a modified construction, which shows a different arrangement of the recesses. Fig. 4, is a plan view of the tire, as shown in Fig. 1. Fig. 5, is a cross-sectional view of the tire, as shown in Fig. 3. Fig. 6, is a longitudinal view of the same.

A indicates the tire as a whole. B the recesses therein. C the cells therein. D the binding wires. E the base of the tire. F tread of the same.

The tire is preferably constructed of soft vulcanized rubber, and the arrangement of the cells and the recesses are such, that the rubber, when under compression due to the load of the vehicle, will flow evenly into the said cells and recesses, and thus impart the qualities termed cushioning.

When tires are made from solid rubber, the rubber when under compression, can flow but in two directions, namely; in the longitudinal direction of the tire and laterally. This being the case, it will be seen at once that the flow of the rubber in the longitudinal direction would be very short for the reason, that it would be flowing in a direction tending to compress the rubber in a direct line of the tread of the tire, and therefore most of the rubber tends to flow laterally; since rubber cannot be compressed but must flow by displacement, it is easy to see that a tire composed of a solid section might easily be forced beyond the elastic limit of the rubber, and thereby permanently weaken the same.

In the present invention the spacing of the recesses and cells is such that the rubber may flow evenly in all directions from the line of compression, and thereby prevent excessive strains, which would cause rapid disintegration and destruction of the tires.

In my application filed March 24th, 1904, Serial #199,676, I show cells and recesses formed in the tire as shown in the present drawings, but in said prior forms I do not show an unbroken tread surface. In the present case I secure many of the advantages of the tire set forth in the above named application and some distinct advantages due to preserving the tread of the section in unbroken continuity.

In Fig. 1 I show the recesses formed V shape and extending from the sides across the center of the tire. The recesses on one side alternate throughout the length of the tire with the recesses on the opposite side thereof, and with the cells formed in the base, and spaced between the said recesses, and extending upward to about the center of the tire; these cells in the base of the tire are practically sealed when said tire is placed in the metal channel piece usually on the felly of the wheel, and into which the base of the tire fits, and thereby the chambers so made are filled with air which give to the tire pneumatic properties.

In Figs. 5 and 6 the recesses do not extend across the center of the tire but are opposite each other, and form thereby a central web section, which extends from the base of the tire to the tread surface forming an unbroken web between these cells and recesses; this form is provided for the driving wheels of a vehicle, such as the driving wheels of an automobile, for the reason that the longitudinal strength of the tire is thereby strengthened. The binding wires D are arranged as shown, one of them on each side of the tire and one extending at the center of the tire longitudinally through the solid portion of the rubber, and are united at the ends in the usual manner well known to the art, when the tire is fitted in the channel piece.

It is obvious from the foregoing that the recesses B may be formed to alternate as shown in Fig. 1 and at the same time may only extend into the tire the distance as shown in Fig. 5 without departing from the spirit of the invention. By maintaining the tread section unbroken, I prevent the tire from collecting dirt, gravel and mud and throwing same when the vehicle is moving rapidly, which is objectionable. It is also obvious that these tires may be formed of separate sections as indicated by the line x, Fig. 3 and held in place in the channel piece by the binding wires D, whereby if a section becomes injured, it could be removed from the tire and replaced with a new one.

Having thus described my invention what I believe to be new and desire to secure by Letters Patent is,

1. A tire having recesses in its sides which extend toward the center of the tread, said recesses being spaced from each other less than the width of the tire, said tire having cells formed in the base thereof and also presenting an unbroken tread surface, substantially as described.

2. A tire having recesses in its sides which extend toward the center of its tread, said recesses being staggered in relation to each other, in combination with cells in its base, and presenting an unbroken tread surface, substantially as described.

3. A tire having recesses in its sides V shape in form, and constructed to contract under tread pressure in combination with cells in its base, and presenting an unbroken tread surface, substantially as described.

4. A tire having recesses in its sides V shape in form and constructed to contract under tread pressure, and in staggered relation to each other, and presenting an unbroken tread surface, substantially as described.

5. A tire having recesses in its sides extending toward the center of the tread, cells in its base on each side of the center of the tire, and binding wires for the tire, said tire presenting an unbroken tread surface, substantially as described.

6. A tire composed of separate sections, each section having recesses in its sides and cells in its base, and presenting an unbroken tread surface, substantially as described.

7. A tire having recesses in its sides extending and contracting toward the center of the tread, said recesses being spaced from each other less than the width of the tire, and said tire presenting an unbroken tread surface, substantially as described.

8. A tire composed of separate sections, each section having recesses in its sides, cells in its base, and means whereby the sections may be secured to the rim of the wheel, each presenting an unbroken tread surface, substantially as described.

9. A tire having recesses in each of its sides extending and contracting toward the center of the tread and spaced longitudinally thereof and located below the tread surface, substantially as described.

10. A tire having recesses in its sides extending and contracting toward the center of its tread and located below the tread surface thereof, and spaced from each other at a distance less than the width of a tire, substantially as described.

11. A tire having V shape recesses in its sides extending and contracting toward the center of its tread and located below the tread surface thereof, and spaced from each other at a distance less than the width of the tire, substantially as described.

12. A tire having recesses in its sides extending toward the center of the tread and spaced apart longitudinally thereof, cells in its base extending from the base toward the tread and terminating near the center of the tire section, said cells being located between said recesses, the tread surface of the tire being unbroken.

13. A tire having a plurality of recesses in each of its sides which terminate near the center thereof and are adapted to contract under tread pressure, said tire presenting an unbroken tread surface substantially as shown.

14. A tire having a plurality of recesses in each of its sides which extend less than the width of the tire and are adapted to contract under tread pressure, said tire having an unbroken tread surface substantially as shown.

15. A tire having recesses in its sides which extend less than the width of the tire and contract in area as they recede from the surface and spaced from each other longitudinally.

16. A tire having recesses in its sides which extend less than the width of the tire and contract in area as they recede from the surface and adapted to contract under tread pressure, cells in the base thereof, and presenting an unbroken tread surface.

17. A tire having recesses in its sides extending toward the center of the tread and spaced apart longitudinally thereof, cells in its base extending from the base toward the tread and located between said recesses, the tread surface of the tire above said recesses being unbroken.

In testimony whereof, I, EDWIN B. CADWELL, have signed my name to this specification in the presence of two subscribing witnesses, this tenth day of April, 1905.

EDWIN B. CADWELL.

Witnesses:
N. C. MILLER,
H. M. JOHNSON.